United States Patent
Roberts

(10) Patent No.: US 9,555,733 B2
(45) Date of Patent: Jan. 31, 2017

(54) VEHICLE-MOUNTED SIDE PULLER APPARATUS

(75) Inventor: Donald Roberts, Rutledge, TN (US)

(73) Assignee: DUAL-TECH, INC., Bean Station, TN (US)

( * ) Notice: Subject to any disclaimer, the term of this patent is extended or adjusted under 35 U.S.C. 154(b) by 890 days.

(21) Appl. No.: 13/487,691

(22) Filed: Jun. 4, 2012

(65) Prior Publication Data

US 2012/0308353 A1 Dec. 6, 2012

Related U.S. Application Data

(60) Provisional application No. 61/492,883, filed on Jun. 3, 2011.

(51) Int. Cl.
*B60P 3/12* (2006.01)

(52) U.S. Cl.
CPC ...................................... *B60P 3/12* (2013.01)

(58) Field of Classification Search
CPC ................................... B60P 3/12; B60P 3/125
USPC ........................................................ 414/563
See application file for complete search history.

(56) References Cited

U.S. PATENT DOCUMENTS

| | | | |
|---|---|---|---|
| 2,928,557 A * | 3/1960 | Cline ............................ | 212/305 |
| 5,207,552 A * | 5/1993 | Mummert ..................... | 414/563 |
| 6,543,749 B1 * | 4/2003 | Duvall .......................... | 254/323 |
| 7,950,892 B2 * | 5/2011 | Ceccarelli et al. ........... | 414/563 |
| 8,192,135 B2 * | 6/2012 | Ceccarelli et al. ........... | 414/563 |
| 2004/0228714 A1 * | 11/2004 | Ceccarelli et al. ........... | 414/563 |
| 2009/0285662 A1 * | 11/2009 | Addleman et al. ........... | 414/563 |

* cited by examiner

*Primary Examiner* — Jonathan Snelting
(74) *Attorney, Agent, or Firm* — Allen Dyer Doppelt Milbrath & Gilchrist

(57) ABSTRACT

A side puller apparatus includes a frame assembly adapted for mounting to a recovery vehicle, the frame assembly having first and second leg members inclined to approximately form an "A" shape and an upper member extending across tops of the leg members, first and second retractable arm assemblies respectively extendable from opposite ends of the upper member, first and second retractable leg assemblies respectively extendable from lower ends of the first and second leg members, and first and second winch assemblies respectively mounted on the first and second leg members, each winch assembly having a cable routed to a respective one of the arm assemblies, so as to be separately routable from the side puller apparatus during recovery operations.

13 Claims, 3 Drawing Sheets

VEHICLE-MOUNTED SIDE PULLER APPARATUS

CROSS-REFERENCE TO RELATED APPLICATION

This application claims the benefit of U.S. Provisional Application Ser. No. 61/492,883, filed on Jun. 3, 2011, the contents of which are herein incorporated by reference in their entirety.

FIELD OF THE INVENTION

The present invention relates to side pullers for recovery vehicles.

BACKGROUND OF THE INVENTION

Recovery vehicles, such as tow trucks and wreckers, are frequently called upon to recover vehicles under very difficult conditions. For instance, where the wrecked vehicle has careened off a road embankment, it can be very difficult to safely position the recovery vehicle to allow its regular equipment to pull the wrecked vehicle back to the road surface. This is particularly true for traditional tow trucks equipped with hook and chain or wheel lifts. Even for flatbed wreckers, such recoveries can be difficult or dangerous if road conditions do not permit sufficient space for the wrecker bed to be pointed toward the wrecked vehicle.

To address these problems, it is known to equip tow trucks and other recovery vehicles with side pullers. A side puller is usually mounted proximate to the vehicle frame rearward of the cab, between the cab and the wheel lift or other recovery equipment. The side puller incorporates a winch with a cable that tends out toward one side of the vehicle supported by a frame. The cable can be attached to, and used recover vehicles at angles perpendicular to the vehicle. Although conventional side pullers have proved very useful, and greatly increased the safety and versatility of those recovery vehicles equipped with them, further improvements are possible.

SUMMARY OF THE INVENTION

In view of the foregoing, it is an object of the present invention to provide an improved vehicle-mounted side puller apparatus. According to an embodiment of the present invention, a side puller apparatus includes a frame assembly adapted for mounting to a recovery vehicle, the frame assembly having first and second leg members inclined to approximately form an "A" shape and an upper member extending across tops of the leg members, first and second retractable arm assemblies respectively extendable from opposite ends of the upper member, first and second retractable leg assemblies respectively extendable from lower ends of the first and second leg members, and first and second winch assemblies respectively mounted on the first and second leg members, each winch assembly having a cable routed to a respective one of the arm assemblies, so as to be separately routable from the side puller apparatus during recovery operations.

According to a method aspect, a method of using the side puller apparatus when mounted on a recovery vehicle during a recovery operation includes routing a cable from each of the winch assemblies via each of the arm assemblies to separate points during the recovery operation. The cables can be routed from the same side of the recovery vehicle (e.g., to different points on a vehicle being recovered) or from different sides (e.g., to the vehicle being recovered and to a tie down point) to enhance recovery operations.

These and other objects, aspects and advantages of the present invention will be better appreciated in view of the drawings and following detailed description of preferred embodiments.

DETAILED DESCRIPTION OF A PREFERRED EMBODIMENT

Figure 1:
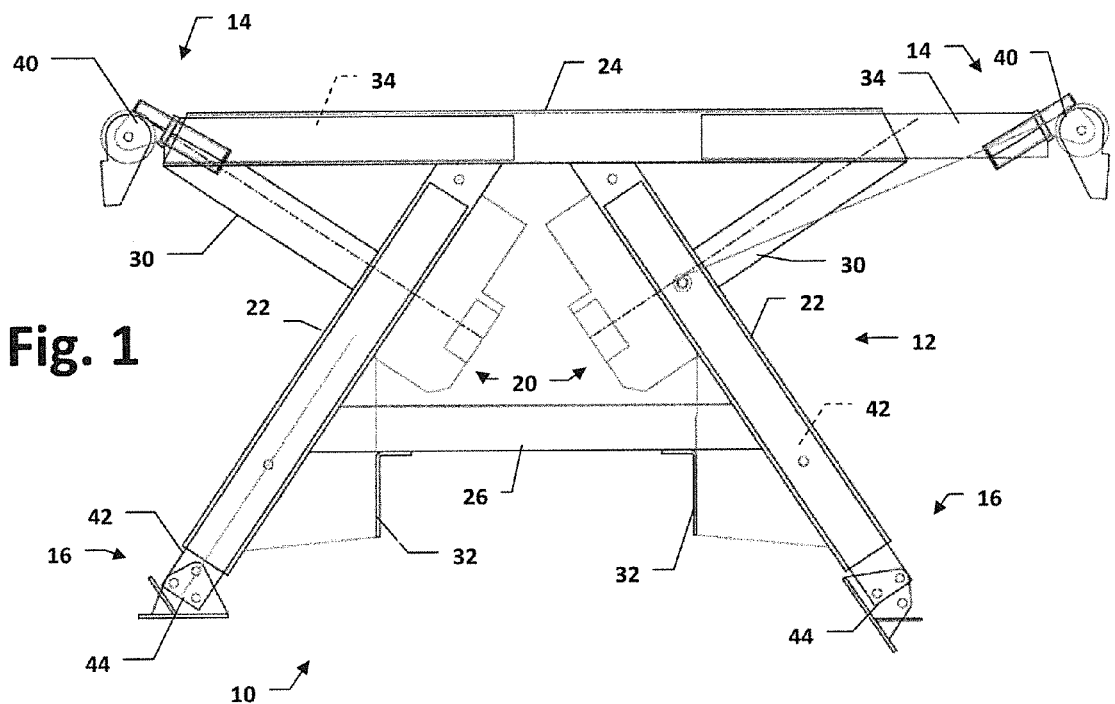
FIG. 1 is a front view of a side puller apparatus, according to an embodiment of the present invention.
Figure 2:
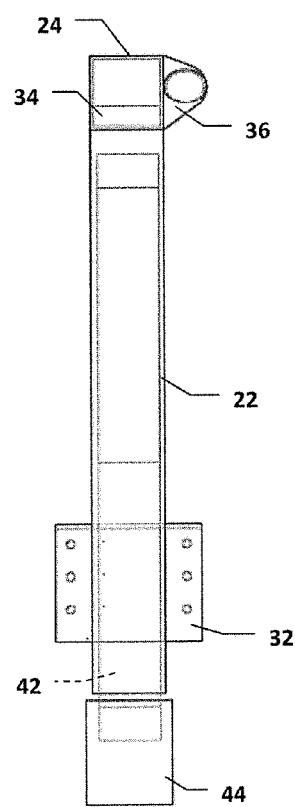
FIG. 2 is a side view of the side puller apparatus of FIG. 1.

Referring to FIGS. 1 and 2, according to an embodiment of the present invention, a side puller apparatus 10 includes a frame assembly 12, a pair of retractable arm assemblies 14, a pair of retractable leg assemblies 16 and a pair of winch assemblies 20. The frame assembly 12 is adapted for mounting to a recovery vehicle, and preferably to the frame of the recovery vehicle proximate to the rearward end of its cab. The side puller apparatus 10 is configured to deploy cable from the winch assemblies 20 via either retractable arm assembly 14 to recover vehicles or other objects located to the side of the recovery vehicle, with the retractable leg assemblies deployable to stabilize the recovery vehicle during recovery operations.

The frame assembly 12 is preferably made of steel or other sufficiently strong and rigid material. The frame assembly 12 can be painted or otherwise coated to enhance corrosion resistance and appearance. The frame assembly 12 includes a pair of leg members 22, an upper member 24, a lower cross-member 26, a pair of upper member braces 30 and a pair of vehicle frame brackets 32. The frame components are preferably welded for maximum strength but other connection types could also be used.

The leg members 22 are inwardly inclined forming approximately an A-shape. The leg members 22 are preferably hollow so as to slidably accommodate portions of the retractable leg assemblies 16 therein. The tops of the leg members 22 connect to the upper member 24, with the cross member 26 extending between the leg members 22 approximately ½ to ¾ of the vertical distance toward the bottom thereof.

The upper member 24 extends generally horizontally is preferably hollow so as to slidably accommodate the retractable arm assemblies 14 is opposite ends thereof. The lower member braces 30 extend between the leg members 22 and opposite ends of the upper member 24 to provide additional support thereto.

The vehicle frame brackets 32 are generally L-shaped and extend downwardly from the cross member 26 to facilitate connection of the frame assembly 12 to the frame of a recovery vehicle. The brackets 32 can be pre-drilled for bolting to the vehicle frame.

Each retractable arm assembly 14 includes an arm 34, an angled sheave mount 36 and a sheave 40. The arm 34 is slidably received in a respective end of the top member 24 of the frame assembly 12. The sheave mount 36 extends rearwardly of the arm 34 and defines a downwardly angled bore therein. The sheave 40 is received in the bore of the sheave mount 36 and can rotate therein. Cable from the respective winch assembly 20 tends around the sheave 40 and can be routed to vehicles or other objects for recovery.

Each retractable leg assembly 16 includes a leg 42 and a foot 44. The leg 42 is slidably received in a respective leg member 22 of the frame assembly 12. The foot 44 is pivotably attached to the lower end of the leg 42 to establish a suitable base therefor when extended.

The winch assemblies 20 are mounted to the inner surfaces of the leg members 22 of the frame assembly and each includes a winch capable of winding and unwinding cable that is routed to respective sheaves 40 of the arm assemblies 34. Preferably, dual winch assemblies 20 are used, although the present invention is not necessarily limited thereto. However, the convenience and functionality of the side puller apparatus 10 is greatly enhanced by the use of dual winch assemblies 20 as opposed to a single winch assembly that must be re-routed for use on each side.

In operation, a recovery vehicle equipped with the side puller apparatus 10 travels to a location where recovery is required. If a side recovery is indicated, the recovery vehicle is parked with one side generally oriented toward to the vehicle or other object to be recovered. One or both leg assemblies 16 are secured to provide greater stability to the recovery vehicle during recovery operations.

The arm assembly 34 is extended on the side of the recovery vehicle oriented toward the vehicle or object to be recovered. The amount of extension can be adjusted as desired and/or dictated by the circumstances surrounding the recovery. The cable is extended from the winch assembly 20 on the appropriate side and routed to the vehicle or object to be recovered. After the cable is secured to the vehicle or object, the winch assembly 20 is operated to reel in the cable and recover the object to or near the road surface, at which point the recovery vehicle (or another recovery vehicle) can tow or load the vehicle via conventional means.

Figure 3:
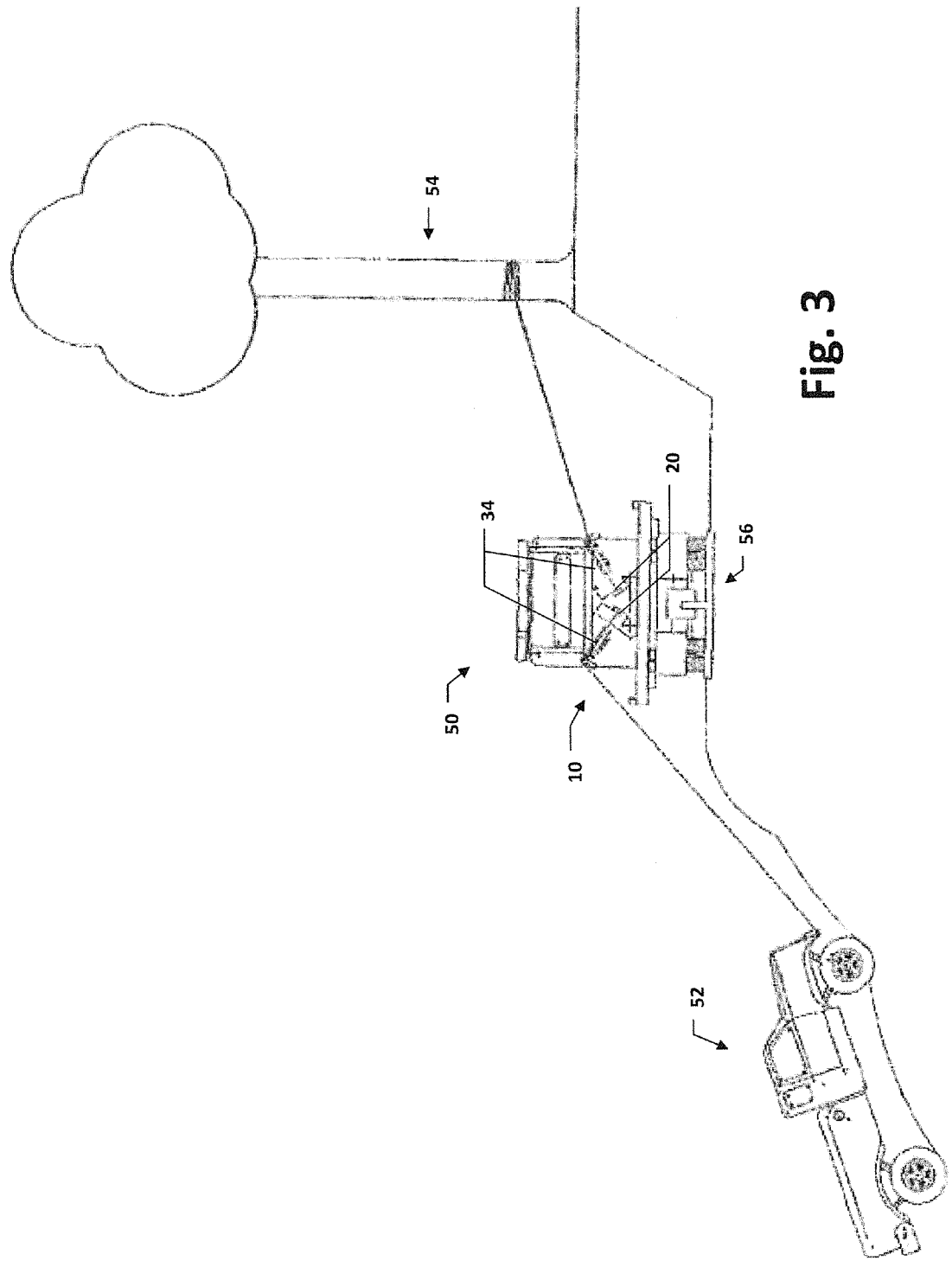
FIGS. 3 and 4 are schematic views of the side puller apparatus of FIG. 1 mounted on a recovery vehicle and engaged in recovery operations.

Referring to FIG. 3, in which a recovery vehicle 50 is equipped with the side puller apparatus 10 mounted on the rear side of a cab thereof, a recovery operation is shown that the apparatus 10 advantageously enables. Cable is routed to a vehicle 52 to be recovered from one winch assembly 20 via one arm assembly 34. Cable from the other winch assembly 20 is routed via the other arm assembly 34 to a tree 54 or other suitable tie down point, increasing the stability and immobility of the recovery vehicle 50 during the recovery operation. In FIG. 3, the recovery vehicle 50 is also equipped with a rear wheel lift assembly 56, the use of which in combination with the retractable leg assemblies 16 adds significant stability to the recovery vehicle 50 during operation.

Figure 4:
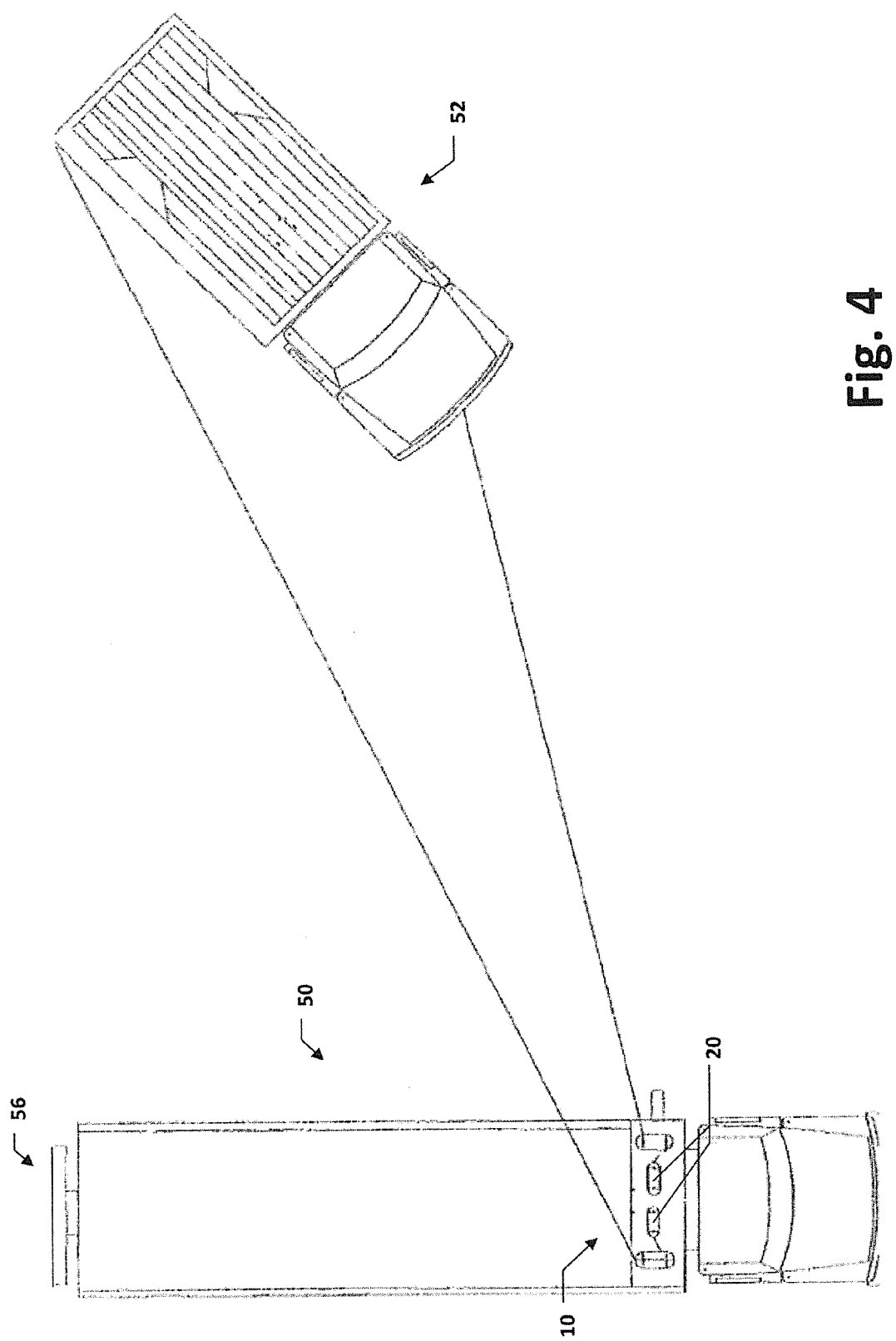

Referring to FIG. 4, in another recovery operation allowed by the side puller apparatus 10, cables from each of the winch assemblies 20 can be routed from the same side of the recovery vehicle 50. With both cables attached to different points (e.g., front and back) of the vehicle 52 being recovered, the side puller apparatus 10 allows for maneuvering of the vehicle 52 during recovery.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A side puller apparatus comprising:
   a frame assembly adapted for mounting to a recovery vehicle;
   first and second arm assemblies extending from opposite sides of the frame assembly; and
   first and second winch assemblies each having a cable routed to a respective one of the arm assemblies, so as to be separately routable from the side puller apparatus during recovery operations;
   wherein the frame assembly includes first and second leg members inclined to approximately form an "A" shape and an upper member extending across tops of the leg members, the first and second arm assemblies being respectively accommodated by opposite ends of the upper member; and
   wherein the first winch assembly is mounted on the first leg member and the second winch assembly is mounted on the second leg member.

2. The side puller apparatus of claim 1, further comprising at least a first retractable leg assembly connected to the frame assembly and deployable to stabilize the recovery vehicle during recovery operations.

3. The side puller apparatus of claim 2, further comprising a second retractable leg assembly extending from an opposite side of the frame assembly from the first retractable leg assembly and also deployable to stabilize the recovery vehicle during recovery operations.

4. The side puller apparatus of claim 1, wherein the first and second arm assemblies are both retractable.

5. The side puller apparatus of claim 1, wherein the frame assembly further includes a lower member extending between the first and second leg members below the upper member and adapted for connection to the recovery vehicle.

6. The side puller apparatus of claim 1, wherein the frame assembly further includes first and second upper member braces respectively extending between the first and second leg members and opposite ends of the upper member.

7. The side puller apparatus of claim 1, wherein the first and second arm assemblies each include a sheave mount and a sheave rotatably mounted therein.

8. The side puller apparatus of claim 2, wherein the first retractable leg assembly includes a leg and foot pivotably attached to a lower end thereof.

9. A side puller apparatus comprising:
   a frame assembly adapted for mounting to a recovery vehicle, the frame assembly including first and second leg members inclined to approximately form an "A" shape and an upper member extending across tops of the leg members;
   first and second retractable arm assemblies respectively extendable from opposite ends of the upper member;
   first and second retractable leg assemblies respectively extendable from lower ends of the first and second leg members; and
   first and second winch assemblies respectively mounted on the first and second leg members, each winch assembly having a cable routed to a respective one of the arm assemblies, so as to be separately routable from the side puller apparatus during recovery operations.

10. The side puller apparatus of claim 9, wherein the frame assembly further includes first and second upper member braces respectively extending between the first and second leg members and opposite ends of the upper member.

11. The side puller apparatus of claim 10, wherein the frame assembly further includes a lower member extending between the first and second leg members below the upper member and adapted for connection to the recovery vehicle.

12. A recovery vehicle comprising a vehicle frame with the side puller apparatus of claim 9 mounted thereto adjacent to a cab of the vehicle.

13. The recovery vehicle of claim 12, further comprising a rear wheel lift assembly mounted to a rear end of the recovery vehicle.

* * * * *